(12) United States Patent
Tanaka et al.

(10) Patent No.: US 6,541,038 B1
(45) Date of Patent: Apr. 1, 2003

(54) METHOD FOR TREATING WOOD WITH A METAL-CONTAINING TREATING AGENT AND WOOD TREATED THEREBY

(75) Inventors: Keijitsu Tanaka, Chiba (JP); Hirobumi Aoki, Chiba (JP); Takashi Echigo, Chiba (JP)

(73) Assignee: SDS Biotech K.K., Tokyo (JP)

( * ) Notice: Subject to any disclaimer, the term of this patent is extended or adjusted under 35 U.S.C. 154(b) by 0 days.

(21) Appl. No.: 09/555,143

(22) PCT Filed: Oct. 22, 1998

(86) PCT No.: PCT/JP98/04790

§ 371 (c)(1),
(2), (4) Date: May 25, 2000

(87) PCT Pub. No.: WO99/26767

PCT Pub. Date: Jun. 3, 1999

Related U.S. Application Data

(60) Provisional application No. 60/077,314, filed on Mar. 9, 1998.

(30) Foreign Application Priority Data

Dec. 17, 1997 (JP) .............................................. 9-348070
Nov. 26, 1997 (JP) .............................................. 9-324254

(51) Int. Cl.$^7$ ...................... A01N 59/00; A01N 59/06; A01N 59/08; A01N 59/16; A01N 59/20; A01N 65/00; B27K 3/52

(52) U.S. Cl. .................. 424/618; 424/195.18; 424/617; 424/619; 424/630; 424/631; 424/632; 424/633; 424/634; 424/635; 424/637; 424/638; 424/639; 424/640; 424/641; 424/646; 424/647; 424/648; 424/650; 424/651; 424/652; 424/654; 424/655; 424/656; 424/677; 424/682; 424/683; 424/684; 424/685; 424/686; 424/687; 424/688; 424/689; 424/690; 424/691; 424/692; 424/693; 424/694; 424/695; 424/696; 424/697; 424/698; 424/722; 424/725; 424/769; 424/770; 424/771; 424/DIG. 11; 424/94.4; 514/667; 514/669; 514/670; 514/673; 514/25; 514/27; 514/450; 514/451; 514/456; 514/460; 514/568; 514/570; 514/731; 514/734

(58) Field of Search .............................. 424/195.1, 600, 424/617, 630, 631, 639, 641, 646, 650, 651, 652, 654, 655, 195.18, 618, 619, 632–635, 637–638, 640, 647, 648, 656, 677, 682–698, 722, 725, 769–771, DIG. 11, 94.4; 514/667, 669, 670, 673

(56) References Cited

U.S. PATENT DOCUMENTS

| | | | | |
|---|---|---|---|---|
| 4,752,509 A | * | 6/1988 | Simonson et al. | ........... 427/440 |
| 4,988,576 A | | 1/1991 | Lin et al. | |
| 5,246,739 A | * | 9/1993 | Lin | ............................. 427/393 |

FOREIGN PATENT DOCUMENTS

| | | |
|---|---|---|
| AU | 35221/78 | 10/1979 |
| JP | 50-33696 | 3/1975 |
| JP | 60-501846 | 10/1985 |
| JP | 61-268729 | 11/1986 |
| JP | 7-88808 | 4/1995 |
| JP | 8-12504 | 1/1996 |
| JP | 9-142386 | 6/1997 |
| JP | 10-218999 | 8/1998 |
| WO | WO96/03546 | 2/1990 |
| WO | 98/24890 | * 6/1998 |

OTHER PUBLICATIONS

Chemical Abstracts 129: 381294, abstracting WO 98/24890, Jul. 1998.*
International Search Report (1999).

* cited by examiner

*Primary Examiner*—John Pak
(74) *Attorney, Agent, or Firm*—Sughrue Mion, PLLC

(57) ABSTRACT

A method for treating wood, characterized by impregnating wood with a metal-containing treating agent containing lignin and/or lignin derivatives and a metal, a metal compound, and/or a metal ion and oxidizing and/or macromolecularizing of the lignin and/or lignin derivatives in the wood to fix the metal component in the wood, and wood and woody materials obtained by the treating method. According to the method of the present invention, while effectively utilizing lignins, lignosulfonic acids, or lignosulfonic acid salts, leaching of the metal component can be suppressed to a low level to thereby retain the effects due to the incorporation of the metal components for a prolonged period.

16 Claims, No Drawings

METHOD FOR TREATING WOOD WITH A METAL-CONTAINING TREATING AGENT AND WOOD TREATED THEREBY

This application is a 371 of PCT/JP98/04790, filed on Oct. 22, 1998.

This application claims benefit of U.S. Application Serial No. 60/077,314 (filing date: Mar. 9, 1998).

TECHNICAL FIELD

The present invention relates to a method for treating wood with a metal-containing treating agent that contains a metal, a metal compound and/or a metal ion and to a woody material containing a metal, a metal compound and/or a metal ion obtained by the method. More particularly, the present invention relates to a method for treating wood characterized by causing lignin and/or a lignin derivative to be contained in a treating agent containing a metal, a metal compound and/or a metal ion, oxidizing and/or macromolecularizing of the lignin or derivative thereof in the wood with a polyphenol oxidizing catalyst and/or heating to fix the lignin or derivative thereof together with a metal component, and to a woody article containing a metal, a metal compound and/or a metal ion obtained by the treating method.

PRIOR ART

Conventionally, treating methods that impregnate wood with treating agents containing various metals, metal compounds and/or metal ions have been practiced in order to impart wood with desirable properties such as antimicrobial properties, microbicidal properties, antiseptic properties, insect-repellent properties, antiviral properties, organism-repellent properties, weatherability, fire resistance, or abrasion resistance or to color wood.

In these treating methods, it is generally preferred that the metals, metal compounds and/or metal ions as active ingredients are contained in the wood in larger amounts. Accordingly, there have heretofore been proposed treating agents to which alkanolamines, for example, are added in order to increase permeability of the metal fine powders, fine powders of metal compounds, or metal ions into wood.

For example, Australian Patent No. 519,146 describes a shelf stability improving agent for cellulose-based materials that is composed of an anti-organism agent containing a metal ion capable of forming an ammine complex and a hydroxyalkylamine to which is added an aliphatic monocarboxylic acid having 6 to 12 carbon atoms. This is to form soap from the amine and carboxylic acid so that permeability into the cellulose material can be enhanced.

Also, U.S. Pat. No. 5,426,121 describes a shelf stability agent for wood that has improved anti-organism effect by containing a reaction product between copper cation and an alkoxylated diamine.

Further, JP-A-H08-12504 describes a shelf stability agent composed of an anti-organism composition containing an antiseptic heavy metal and a triazole compound to which a boric acid compound is added. These are contemplated to improve anti-organism properties by use of an auxiliary component as an anti-organism component for improving anti-organism properties such as an organic antimicrobial component with a metal compound.

The treating agents as described above prepared so as to increase the permeability of metal ions are useful for producing treated wood that contains a large amount of metal component. On the contrary, there is a problem in that the metal component that are impregnated could be readily leached from the treated wood when the treated wood is brought into contact with water, so that the useful properties imparted to the wood by the metal component would be degraded. The leached metals, metal compounds and/or metal ions are released to the ambient environment and scattered, thus causing environmental pollution.

In the various kinds of treating methods described above, efforts have been made in order to increase the permeability into cellulose and wood, but no study has been made to prevent leaching. The organic anti-organism agents to be added in these methods in order to improve the anti-organism properties are mostly poor in long term stability as compared with the metal compounds and metal ions. Therefore, it is difficult to maintain excellent anti-organism properties for a long time by mere addition of the organic-based anti-organism components. Furthermore, addition of a considerable amount of organic-based agent causes an increase in a cost of the production.

To prevent leaching of the metal compound and metal ions, many methods have been proposed for insolubilization of the chemical agents before or after the injection thereof. Specifically, one method is that a target article is first treated with a solution of a metal compound as an active ingredient, and then with chemical agent that increases the fixing property of the metal compound. Another method is that a target article is preliminarily treated with a fixing agent for metal ions prior to a metal compound. The aforementioned methods are generally used. In any rate, multi-stage treatment consisting of two or more steps is required. For example, JP-A-H07-88808 discloses a method for treating wood that sequentially conducts a first stage injection treatment with an alkali solution containing a metal compound and sodium silicate and a second stage injection treatment with a neutral salt solution containing an alkaline earth metal salt to insolubilize the sodium silicate by converting it to an alkaline earth silicic acid salt, thus improving the fixing property of the metal component in the target article for treatment.

However, such a multi-stage treatment has the practical problems in the cost and facility. Because after the treatment in the preceding stage, it requires a drying step for enabling an injection with an agent in the subsequent stage, and separate treatment tanks must be provided for the respective treatment stages.

For this reason, development of a method for treating wood has been desired in respect of a metal-containing treating agent that has high permeability into wood and prevents the metal component from leaching from the wood.

Lignin and lignosulfonic acid or lignosulfonic acid salts obtained in pulp industry are typical examples of biomass. Because of the complexity of its structure and the difficulty of decomposition, they have been utilized only as a dispersant, a granulating agent, a chemical agent for concrete, corrosion inhibitor, starting material for adhesive or the like and find insufficient industrial application so that development of other new methods of application has been desired.

OBJECT OF THE INVENTION

Therefore, an object of the present invention is to provide an improved wood treating method by impregnating wood with a metal, a metal compound, and/or a metal ion that can decrease leaching of the metal, metal compound, and/or metal ion in the wood and to provide a woody article treated with a metal-containing chemical agent by the method.

Another object of the present invention is to provide a useful industrial utilization method for lignin, lignosulfonic acid or lignosulfonic acid salts by use of lignin and/or lignin derivatives as a component of a woody treating agent.

SUMMARY OF THE INVENTION

The present inventors have made intensive research with view of developing a new production method for metal-containing wood that can suppress leaching of a metal, a metal compound, and/or a metal ion to a low level. As a result, they have found that impregnation of wood with lignin, lignosulfonic acid, and/or a lignin derivative, which are organic compounds available at low costs and in large amounts, together with a metal, a metal compound, and/or a metal ion, and then oxidation reaction and/or polymerization reaction of the lignin and/or lignin derivative in the wood result in fixing of the metal, metal compound, and/or metal ion in the wood so that their leaching can be considerably suppressed. The present invention has been accomplished on the basis of these findings.

That is, the present invention provides the following method for treating wood, production method for woody material treated with a metal-containing treating agent, and wood and woody material obtained by the methods.

[1] A method for treating wood characterized by impregnating wood with a metal-containing treating agent containing lignin and/or lignin derivatives and a metal, a metal compound, and/or a metal ion and then oxidizing and/or macromolecularizing the lignin and/or lignin derivatives in the wood to fix the metal component in the wood.

[2] The method for treating wood according to item 1, wherein the metal-containing treating agent contains the metal, metal compound, and/or metal ion in a concentration of 0.5 g/liter or more as metal.

[3] The method for treating wood according to item 1 or 2, wherein the metal-containing treating agent contains at least one metal selected from zirconium, titanium, vanadium, chromium, molybdenum, manganese, iron, cobalt, nickel, palladium, copper, silver, zinc, cadmium, aluminum, tin, lead, antimony, calcium, magnesium, strontium, and barium or ions thereof.

[4] The method for treating wood according to item 1, wherein the metal-containing treating agent is prepared by mixing a first agent containing a metal, a metal compound and/or a metal ion and an organic alkalizing agent, and a second agent containing lignin and/or lignin derivatives.

[5] The method for treating wood according to item 4, wherein an organic alkalizing agent is selected from monoethanolamine, diethanolamine, triethanolamine, and ethylenediamine.

[6] The method for treating wood according to any one of the items 1 to 5, wherein the oxidizing and/or macromolecularization reaction is accelerated by heating.

[7] The method for treating wood according to item 6, wherein the heating is performed at a temperature within the range of 20 to 300° C.

[8] The method for treating wood according to item 7, wherein the heating is performed at a temperature within the range of 40 to 150° C.

[9] The method for treating wood according to any one of the above items 1 to 8, wherein the oxidizing and/or macromolecularization reaction is performed in the presence of a polyphenol oxidizing catalyst.

[10] The method for treating wood according to item 9, wherein the polyphenol oxidizing catalyst is catechol oxidase, laccase, polyphenol oxidase, ascorbic acid oxidase, bilirubin oxidase or peroxidase.

[11] The method for treating wood according to any one of the items 1 to 10, wherein the lignin derivative is obtained by crosslinking reaction and/or macromolecularization reaction of lignin or ligninsufonic acid with a phenolic compound and/or an aromatic amine compound.

[12] The method for treating wood according to item 11, wherein, the phenolic compound is at least one compound selected from the group consisting of pyrocatechol, hydroquinone, pyrogallol, gallic acid, tannic acid, and ferulic acid.

[13] Wood treated by the method according to any one of the items 1 to 12.

[14] A method for producing a woody material containing a metal, a metal compound, and/or a metal ion, characterized by comprising a step in which a raw material wood is treated by the method according to any one of the items 1 to 12.

[15] The method for producing a woody material according to item 14, wherein the raw material wood is laminated lumber, single plate laminate, plywood, particle board, fiber board, or raw materials thereof.

[16] A woody material containing a metal, a metal compound, and/or a metal ion obtained by the production method according to item 14 or 15.

DETAILED DESCRIPTION

Hereinafter, the present invention will be described in detail.

(1) Summary

The present invention performs oxidization reaction and/or macromolecularization reaction (including besides polymerization reaction, reactions between reaction products or with the components contained in the wood that increase molecular weight), in the existence of both lignin and/or a lignin derivative and a metal, a metal compound, and/or a metal ion, with a polyphenol oxidizing catalyst and/or heating to thereby firmly fix the reaction product of lignin and/or lignin derivative, and the metal, metal compound, and/or metal ion or reaction products thereof in the wood, resulting in suppression of leaching of the metal, metal compound, and/or metal ion to impart the treated wood with a metal-containing effect that is stable for a long term.

That is, the present invention basically utilizes oxidization reaction using oxygen (air) as an oxidizing agent and/or macromolecularization reaction. However, it is surprising that such a reaction proceeds at a sufficient rate in an environment such as inside the wood where oxygen supply rate is low. In particular, the impregnation treatment of wood including pressure reduction operation as a part of the treating step is extremely effective as an operation for increasing the injection amount of the treating liquid, and is also used in the present invention. However, in the treating liquid and treated wood after the pressure reduction operation, the concentration of dissolved oxygen in the liquid has decreased, and therefore this state is disadvantageous to utilizes oxygen as an oxidizing agent. In spite of this, surprisingly, it has been found that even in the wood after the pressure reduction operation, effective oxidization reaction and/or macromolecularization reaction proceeds in its inside.

In this unique feature, the present invention is quite different from the conventional technology in which a phenolic compound is added to lignin or a lignocellulosic material and oxidation of phenol is proceeded in the presence of enzyme (for example, WO96/03546, etc.). The present inventors have also proposed a method in which a porous article is treated in the presence of an enzyme (JP-A-H09-142386). The present invention is also different from the invention described in the published application in that the reaction can proceed without using any enzyme.

Although details of the mechanism in which such a phenomenon proceeds are unclear, it would be considered that the metal ion used in the present invention functions as an oxidizing agent and oxidation-reduction reaction using lignin and/or align in derivative as a reducing agent is involved. In particular, acceleration of the reaction by heating makes it possible to efficiently fix the metal, metal compound, and/or metal ion by combination with oxidation reaction and/or macromolecularization reaction utilizing oxygen (air) as an oxidizing agent. Further, an oxidation-reduction reaction using a phenolic compound and/or aromatic amine compound as a reducing agent can be utilized.

(II) Treating Agent Composition

[Lignin and Lignin Derivatives]

In the present invention, lignin to be impregnated to wood together with a metal, a metal compound and/or a metal ion and oxidized and/or macromolecularized in the wood is a major constituent of higher plants together with cellulose and hemicellulose and basically a complicated high molecular compound that comprises phenylpropane monomers bonded to each other through carbon-carbon bonds, ether bonds or the like.

In the present invention, however, the structure of lignin is not particularly limited and alkali lignin, lignosulfonic acid, or lignosulfonic acid salts (obtained as a waste liquid from pulp industry) may be advantageously used as the lignin and/or lignin derivatives.

Although the lignin, lignosulfonic acid or lignosulfonic acid salts derived from the pulp waste liquid may be used as they are, it is desirable that water-insoluble solid components are removed in order to increase the amount of impregnation into wood. Examples of the removal treatment include centrifugal separation, filtration, and standing. Specific conditions of respective treatments, for example, rotation number of centrifugal separation, filtration material, standing time, etc. are controlled depending on the kind of lignin raw material, kind and shape of wood as the object of the treatment, and the like. For example, in the case where pressurized injection treatment is conducted with view to producing rot-proof wood for the foundation, it is desirable that water-insoluble solid components in the pulp waste liquid having a diameter or longer diameter of 1 $\mu$m or more, preferably 0.5 $\mu$m or more, and more preferably 0.1 $\mu$m or more, be removed by filtration. Those desalted or desaccharidated by ultrafiltration or, to further increase degree of impregnation, lower molecular fractions, for example, having a molecular weight of 5,000 to 100,000 or less can be used.

As the lignin derivative used for the purpose of the present invention, use may be made of, in addition to lignosulfonic acid, products of lignin or lignosulfonic acid by acetic acid esterification, propionic acid esterification, carboxymethyl etherification 2-hydroxyethyl etherification, 2-acetoxyethyl etherification, or 2-hydroxypropyl etherification, alkylation with an alkyl halide, hydroxymethylation with formalin, crosslinking with formalin, an epoxy compound, an isocyanate compound, an allyl compound, acetone, or the like, crosslinking with other phenolic compound and/or aromatic amine compound, sulfonation with neutral sulfite liquid, desulfonation, for example, by heating. Hydrolyzed product of lignin or lignin derivatives can also be used. Lignin or lignin derivatives to which compound treatments are conducted and a mixture thereof are usable.

Among the lignin derivatives or lignosulfonic acid, the compounds obtained by crosslinking reaction of the lignin or lignosulfonic acid with the phenolic compound and/or aromatic amine compound can be used particularly advantageously for the purpose of the present invention. Such a crosslinking reaction can be practiced, for example, by heating lignin or lignosulfonic acid and a phenolic compound and/or an aromatic amine compound together with formalin or the like in the presence of an acid catalyst such as sulfuric acid. Specific examples of the phenolic compound and/or aromatic amine compound used for producing such a derivative include pyrocatechol, hydroquinone, pyrogallol, gallic acid, tannic acid, ferulic acid, catechin, urushiol, 4-hydroxycinnamyl alcohol, o-coumarinic acid, p-coumarinic acid, coniferyl alcohol, coniferyl aldehyde, ethyl-3,4-dihydroxycinnamic acid, 3-hydroxy-4-methoxycinnamic acid, 3,4-dihydroxycinnamic acid, 3-hydroxy-4-methoxycinnamaldehyde, vanillin, o-vanillin, vanillic acid, vanillyl alcohol, o-vanillyl alcohol, isovanillyl alcohol, vanillylamine, vanillinazine, 4-hydroxy-3-methoxybenzonitrile, syringic acid, sinapyl alcohol, sinapic acid, sinapinic aldehyde, homovanillic acid, homovanillyl alcohol, homovanillonitrile, hesperidin, chlorogenic acid, hinokitiol, tert-butylhydroquinone, phenylhydroquinone, trimethylhydroquinone, lauryl gallate, octyl gallate, 3,4-dihydroxybenzoic acid, 1,2-dihydroxynaphthalene, 2,3-dihydroxynaphthalene, 6,7-dihydroxy-2-nahthalenesulfonic acid, nitrohumic acid, anthrarobin, alizarin, quinizarin, o-phenylenediamine, p-phenylenediamine, 3,4-diaminobenzophenone, o-anisidine, p-anisidine, o-aminophenol, p-aminophenol, 1,2-diaminoanthraquinone, 1,4-diaminoanthraquinone, etc. Among these compounds, in particular, pyrocatechol, hydroquinone, pyrogallol, gallic acid, tannic acid, or ferulic acid can be used advantageously. Not only can these compounds be used for converting lignin or lignosulfonic acid into crosslinked derivatives thereof, but also they can be used as they are as a wood treating agent composition for the purpose of controlling fixing property of the metal, metal compound, and/or metal ion.

Besides the above-described phenolic compound and/or aromatic amine compound, many compounds can be used to convert lignin or lignosulfonic acid into derivatives thereof by crosslinking reaction. For example, compound listed below can be used, such as quercetin, rutin, o-hydroxybenzoic acid, p-hydroxybenzoic acid, guaiacol, 4-methoxyphenol, ascorbic acid, isoascorbic acid, biphenol, bisphenol A, 3,5,3',5'-tetrahydroxymethylbisphenol A, 4,4'-ethylenedianiline, methylhydroquinone, ethylhydroquinone, 1-hydroxybenzotriazole, 6-hydroxy-2,4,5-triaminopyrimidine, 4,5,6-triaminopyrimidine, 2,3-dihydroxypyridazine, 3,6-dihydroxypyridazine, 2,3-dihydroxypyridine, methyl-4-hydroxy-3-methoxybenzoic acid, 4,5-diamino-6-hydroxy-2-mercaptopyrimidine, 2,3-diaminopyridine, 2,5-dihydroxy-1,4-benzoquinone, 2,5-dihydoxybenzonic acid, 3,4-dihydroxy-3-cyclobuten-1,2-dione, 3-(3,4-dihydroxyphenyl)-L-alanine, 2-amino-3-hydroxypyridine, 3-amino-2-methoxydibenzofuran, 2,4-dimethyoxyaniline, 2,5-dimethoxyaniline, 3,4-dimethoxyaniline, 2,3-dimethoxyphenol, 3,4-dimethoxyphenol, 2-methoxy-4-methylphenol, 2-methoxy-5-methylaniline, 2-methoxy-5-nitroaniline, 4-methoxy-2-nitroaniline, 3-methoxysalicylic acid, acetylsalicylic acid, methyl salicylate, ethyl salicylate, 3-methylcatechol, 4-methylcatechol, methyl gallate, propyl gallate, 3,4,5-trimethoxyaniline, 3,4,5-trimethoxyphenol, tropolone, purpurogallin, salicylaldoxime, 3-amino-5,6,7,8-tetrahydro-2-naphthol, 1,5-dihydroxynaphthalene, 3,5-dihydroxy-2-naphthoic acid, 4-hydroxy-1-naphthalenesulfonic acid, purpurin, and 2,3-dihydro-9,10-dihydroxy-1,4- anthracenedione and various azo dyes and the like. To convert lignin or lignosulfonic acid into derivatives thereof by crosslinking reaction, compound listed below can be used: aromatic compound having a methoxy group such as 2',5'-dimethoxyacetophenone, 3',4'-dimethoxyacetophenone, 1,4-dimethoxybenzene, veratrol, 2,3-dimethoxybenzoic acid, 2,5-dimethoxybenzoic acid, veratric acid, veratraldehyde, veratrylamine, homoveratric acid, homoveratrylamine, homoveratronitrile, 3,4-dimethoxycinnamic acid, 3,4-dimethoxycinnamonitrile, 3,4-dimethoxybenzyl alcohol, 3,4-dimethoxyphenethylamine, 3,4-dimethoxystyrene, (3,4-dimethoxyphenyl)acetic acid, (3,4-dimethoxyphenyl)acetonitrile, (3,4-dimethoxyphenyl)acetone, 3-(3,4-dimethoxyphenyl)propionic acid, 3-(3,4-dimethoxyphenyl)propanol 4-(3,4-dimethoxyphenyl)butyric acid, and 3-(3,4-dimethoxyphenyl)propanol, and quinone compound such as anthraquinone-2-sulfonic acid, anthraquinone-1,5-disulfonic acid, anthraquinone-2,6-disoulfonic acid, anthraquinone-2-carboxylic acid, 1-aminoanthraquinone, 2-aminoanthraquinone, anthrarufin, aminonaphthoquinone, 1,8-dihydroxyanthraquinone, camphorquinone, dehydroascorbic acid, 2-hydroxy-1,4-naphthoquinone, isatin, and 5-nitroisatin, and various anthraquinone dyes.

Derivatives of the phenolic compounds and/or aromatic amine compounds can also be used as starting materials for producing lignin derivatives or lignosulfonic acid derivatives used in the present invention. Specific examples of such aphenolic compound derivative and/or aromatic amine compound derivative include those compounds having, on their aromatic rings of phenolic compounds and/or aromatic amine compounds, a substituent group containing a polyoxyethylene chain, a saturated or unsaturated alkyl chain having 1 to 22 carbon atoms, hydroxymethyl, polyol, polyamine, allyl, epoxy, or aryl in its structural part. Introduction of these substituent groups can be practiced on lignin or lignosulfonic acid.

For the purpose of the present invention the concentration of the lignin and/or lignin derivative in a treating agent solution upon treating wood is 0.001 to 95 wt %, preferably 0.01 to 60 wt %.

[Metal, Metal Compound, and Metal Ion]

In the present invention, the metal, metal compound and/or metal ion fixed in wood may be selected freely depending on the purpose for which treated wood is utilized. A specific examples thereof are metals, metal compounds, and/or metal ions, containing at least one metal or its ion selected from zirconium, titanium, vanadium, chromium, molybdenum, manganese, iron, cobalt, nickel, palladium, copper, silver, zinc, cadmium, aluminum, tin, lead, antimony, calcium, magnesium, strontium, or barium. More specifically examples thereof include compounds with cationized compounds of these metals and anions such as $F^-$, $Cl^-$, $Br^-$, $I^-$, $NO_3^-$, $BO_3^{3-}$, $PO_4^{3-}$, $P_2O_7^{4-}$, $SO_4^{2-}$, $SO_3^{2-}$, $S_2O_3^{2-}$, $SCN^-$, $CO_3^{2-}$, $O^{2-}$, $OH^-$, $B_4O_7^{2-}$ $B(OH)_4^-$, $BF_4^-$, or organic acids such as naphthenic acid, oleic acid, stearic acid, octanoic acid, acetic acid, formic acid, benzoic acid, citric acid, lactic acid, or tartaric acid, and complexes thereof and further hydrates.

Also, chelate complexes of the cationated above metals with organic compounds or ionic groups can be used in the present invention. As the organic compound to be added for forming chelate complexes with the metal ions, many compounds conventionally known can be used. For example, phenolic compounds or aromatic amine compounds such as pyrocatechol, gallic acid, hinokitiol, catechin, pyrogallol, o-phenylenediamine, and 2-aminophenol, phosphonic acids such as ethane-1,1-diphosphonic acid and derivatives thereof, ethanehydroxy-1,1,2-triphosphonic acid, ethane-1,2-dicarboxy-1,2-diphosphonic acid, and methanehydroxyphosphonic acid, phosphonocarboxylic acids such as 2-phosphonobutane-1,2-dicarboxylic acid, 1-phosphonobutane-2,3,4-tricarboxylic acid, and α-methylphosphonosuccinic acid, amino acids or amino acid analogs such as aspartic acid, glutamic acid, glycine, 2-aminoisobutyric acid, and β-alanine, aminopolyacetic acid such as iminodiacetic acid, nitrilotriacetic acid, ethylenediaminetetraacetic acid, and diethylenetriaminepentaacetic acid, polymeric electrolytes such as polyacrylic acid, polyitaconic acid, polymaleic acid, maleic anhydride copolymer, and carboxymethylcellulose, non-dissociating polymers such as polyethylene glycol, polyethylene oxide, and polyvinyl alcohol, organic acids such as benzenepolycarboxylic acid, oxalic acid, malic acid, diglycolic acid, succinic acid, oxydisuccinic acid, carboxymethyloxysuccinic acid, gluconic acid, citric acid, lactic acid, and tartaric acid, carboxymethylated products of sucrose, lactose, and pentaerythritol, organic alkalizing agent such as monoethanolamine, diethanolamine, triethanolamine, N-methylethanolamine, N,N-dimethylethanolamine, N-ethylethanolamine, N,N-diethylethanolamine, N-butylethanolamine, N,N-dibutylethanolamine, 3-amino-1-propanol, 2-(ethylamino)ethanol, 2-(2-aminoethoxy)ethanol, 2-(2-aminoethylamino)ethanol, triethanolamine ethoxylate, vicine, propanolamine, isopropanolamine, diisopropanolamine, triisopropanolamine, 2-amino-1-propanol, 3-amino-1,2-propanediol, 2-amino-1,3-propanediol, 2,3-diamino-1-propanol, 1,3-diamino-2-propanol, 2-amino-2-propanol, 1-[N,N-bis(2-hydroxyethyl)amino]-2-propanol, ethylenediamine, N,N-dimethylethylenediamine, N,N'-dimethylethylenediamine, N-ethylethylenediamine, N,N'-bis(2-hydroxyethyl)ethylenendiamine, diaminopropane, triethylenetetramine, pentaethylenehexamine, polyethyleneimine, polyallylamine, and triazacyclononane, triazacyclododecane, organic compounds such as starch, urea, chitosan, and polylysine.

Further, to effectively fix the metal produced from the above metal compound or metal chelate complex by oxidation-reduction reaction to the inside of wood by the method for treating wood according to the present invention, it is preferred that a metal compound or metal chelate complex containing in particular copper or silver be used.

Besides the above metal compounds or metal complexes, fine powder of a metal, or fine powder of a sparingly water-soluble metal compound or metal chelate complex can also be used for the purpose of the present invention. Such a fine powder may be composed of fine particles of various sizes depending on the purpose. To impregnate a sufficient amount of a treating agent to wood, powder composed of fine particles having a diameter of 0.5 $\mu$m or less, more preferably 0.1 $\mu$m or less can be used advantageously.

It is desirable that the concentration of the metals, metal compounds, and/or metal ions used in the present invention is adjusted depending on solubility, the strength of anti-organic properties that the metal used has, the purpose of treatment, etc. To impart wood with a sufficient metal-containing effect, it is desirable that treatment be conducted with a treating agent that contains the metal, metal compound, and/or metal ion in a solution upon treating wood in a concentration of 0.5 g/liter, more preferably 1.0 g/liter or more as metal.

[Polyphenol Oxidizing Catalyst]

In producing treated wood product, (a) in the case where wood is treated with lignin, (b) in the case where a derivative of lignin or lignosulfonic acid is produced using a phenolic compound and/or aromatic amine compound having no hydrophilic substituent group such as a carboxyl group or a sulfonic acid group, and wood is treated with the derivative, (c) in the case where a derivative of lignin or lignosulfonic acid is produced using a compound having excellent reactivity that has a plurality of hydroxyl groups or amino groups at ortho or para positions on the aromatic ring, and wood is treated with the derivative, and (d) in the case where a derivative of lignin or lignosulfonic acid is produced using a compound having excellent reactivity that has, in addition to hydroxyl groups or amino groups, an allyl structure at ortho or para positions on the aromatic ring, and wood is treated with the derivative, fixing of the metal, metal compound, and/or metal ion can be effectively achieved in particular by heating. Use of polyphenol oxidizing catalyst is useful for effectively achieving fixing of the metal, metal compound, and/or metal ion by curing at a lower temperature and in a shorter time.

However, (e) in the case where wood is treated with lignosulfonic acid, (f) in the case where a derivative of lignin or lignosulfonic acid is produced using a phenolic compound and/or aromatic amine compound having a hydrophilic substituent group such as a carboxyl group or a sulfonic acid group, and wood is treated with the derivative, (g) in the case where a derivative of lignin or lignosulfonic acid is produced using an aromatic compound containing a substituent group having low reactivity, such as a methoxy group, and wood is treated with the derivative, and (h) in the case where a derivative of lignin or lignosulfonic acid is produced using an aromatic compound that has only one OH group or $NH_2$ group on the aromatic ring and has low reactivity, and wood is treated with the derivative,it is particularly preferred that the oxidation reaction and/or macromolecularization reaction can be accelerated by use of a polyphenol oxidizing catalyst in order to oxidate and/or macromolecularize these wood treating agent compositions sufficiently to fix the metal, metal compound, and/or metal ion. Examples of such a polyphenol oxidizing catalyst include metal chelate complexes, natural enzymes, etc.

Among the metal complexes, artificial enzymes imitating oxidoreductase enables one to obtain effective catalytic effect by use of a metal chelate complex in a lower concentration and is useful for the purpose of the present invention. Specific examples of such an artificial enzyme include cyclic nitrogen-containing compounds such as triazacyclononane and triazacyclododecane, or N-methylated derivatives thereof, phthalocyanine or porphyrin, or their derivatives having a hydrophilic substituent.

Also among natural enzymes, a wide variety of polyphenol oxidizing enzymes may be utilized so far as they have polyphenol oxidizing catalytic effect. They can be advantageously utilized for the purpose of the present invention as metal complexes having highsafety. Examples of such an enzyme include polyphenol oxidizing enzymes such as catechol oxidase, laccase, polyphenol oxidase, ascorbic acid oxidase, or bilirubin oxidase produced by microorganisms, for example, fungi or bacteria, or plants. In particular, when it is desired to conduct oxidation reaction and/or macromolecularization reaction rapidly, those having polyphenol oxidizing effect in alkali pH region are more desirable.

The oxidation reaction and/or macromolecularization reaction by enzymatic oxidation can also be practiced by use of an enzyme having peroxidase effect with hydrogen peroxide, such as peroxidase, or lignin peroxidase, manganese peroxidase derived from microorganisms or plants. Addition and supply of hydrogen peroxide is conducted by adding a hydrogen peroxide solution directly, using a hydrogen peroxide precursor such as perborate or percarbonate instead of hydrogen peroxide, or using oxidase that can produce hydrogen peroxide and a substrate thereof. This may be practiced in various manners depending on the object of treatment and treating method. Examples of the oxidase that can produce hydrogen peroxide include glucose oxidase, alcohol oxidase, glycerol oxidase, amine oxidase, amino acid oxidase, D-amino acid oxidase, allyl alcohol oxidase, aldehyde oxidase, galactose oxidase, sorbose oxidase, ureate oxidase, xanthine oxidase, cholesterol oxidase, etc., and particularly preferably, glucose oxidase and alcohol oxidase.

The polyphenol oxidizing enzymes that are used for the purpose of the present invention can be obtained from various microorganisms and plants. Examples of microorganisms that produce polyphenol oxidizing enzymes include moulds belonging to Deuteromycotina, Basidiomycotina, Ascomycotina, etc., bacteria belonging to Actinomycetales, Bacillus, etc. Also, plants such as Acerpseudoplatanum, Dioscorea, Abelmoschus, Psidium, Helianthus, potato, apple, pumpkin, cucumber, wheat, soybean, alfalfa, and horseradish can be utilized for obtaining polyphenol-oxidizing enzymes that are used for the purpose of the present invention. Among these, moulds belonging to Deuteromycotina or Basidiomycotina, more specifically *Myrothecium verrucaria* SD3001 (deposited at Bioengineering Industrial Technology Laboratory, Institute of Industrial Science and Technology, Ministry of International Trade and Industry, Japan (address: No. 1-3, Higashi 1-chome, Tsukuba-shi, Ibaragi-ken, Japan) on May 29, 1995 under accession number FERM P-14955 and transferred to international deposition under the Budapest Treaty on Apr. 24, 1996 under accession number FERM BP-5520) and *Myrothecium roridum* SD3002 (deposited at Bioengineering Industrial Technology Laboratory, Institute of Industrial Science and Technology, Ministry of International Trade and Industry, Japan (address: No. 1-3, Higashil-chome, Tsukuba-shi, Ibaragi-ken, Japan) on Oct. 26, 1995 under accession number FERM P-15255 and transferred to international deposition under the Budapest Treaty on Apr. 24, 1996 under accession number FERM BP-5523) can be utilized particularly preferably.

The polyphenol oxidizing enzyme used in the present invention can be obtained by cultivating strains and variants thereof belonging to the above microorganisms, for example, fungi or bacteria. Besides, the enzyme can be prepared by utilizing genetically engineered microorganisms. That is, the enzyme can also be produced by cultivating transformed host cells under the conditions that enzyme protein can be expressed and then recovering the enzyme protein from the culture medium, the host cells being transformed using an expression vector containing a DNA vector having a replication origin for replicating vectors in the host organism, the DNA vector having inserted therein a DNA sequence coding for the above enzyme protein together with appropriate promoter, operator, and terminator DNA sequences having a function of expressing an enzyme in the host organism, or by incorporating into the host cell DNA a DNA sequence coding for the above enzyme protein together with appropriate promoter, operator, and terminator DNA sequences having a function of expressing an enzyme in the host organism.

To obtain the DNA fragment coding for the enzyme protein of the present invention, conventional methods can be conducted, for example, identifying the target DNA fragment using cDNA or genome library from a strain belonging to the above microorganisms, for example, fungi or bacteria as an isolation source and oligonucleotide synthesized based on the amino acid sequence of the enzyme protein of the present invention as a probe, selecting a clone that expresses the activity of oxidizing enzyme, or selecting a clone producing a protein that reacts with an antibody to the above enzyme protein.

The enzyme protein of the present invention can also be prepared by extraction from seeds, fruit, or leaves derived from the above plants.

For cultivation of strains or variants thereof belonging to fungi or bacteria for obtaining the enzyme protein of the present invention, usually used synthetic media or nutrient media containing organic carbon sources and organic nitrogen sources may be employed. It is preferred that the metal ion that the target enzyme protein has in its active center be added in the culture medium in a concentration of from 0.001 mM to 10 mM, preferably from 0.01 mM to 1 mM as a metal salt upon cultivation.

In the case where the polyphenol-oxidizing enzyme of the present invention is secreted outside the fungal or bacterial cells, it can be recovered from the medium by conventional methods. The recovering procedure includes a series of procedures of separating cells from the culture medium by centrifugal separation, filtration, or membrane separation and conducting chromatography, for example, ion exchange chromatography. Also, membrane concentration using an ultrafiltration membrane is effective. In the case where the enzyme protein is accumulated in the fungal or bacterial cells, or it is exists in the tissues of plants, it can be recovered from the microbial cells or plant tissues by conventional methods. The recovering procedure includes a series of procedures of mechanical collapse of the tissue by homogenization, separation and extraction of enzyme protein solutions by centrifugal separation, filtration, or membrane separation, and conducting chromatography, for example, ion exchange chromatography. Also, membrane concentration using an ultrafiltration membrane is effective.

In the case where a definition on the activation amount of polyphenol oxidizing catalyst is made such that the activation amount of oxidizing 1 µmol of a phenolic compound and/or aromatic amine compound per minute is 1 unit (hereinafter, abbreviated as U), the oxidation activity concentration of the polyphenol oxidizing catalyst upon use of the polyphenol oxidizing catalyst of the present invention in treating wood is 1 to 100,000 U/liter, preferably 10 to 5,000 U/liter.

[Other Treating Agent Components]

For the purpose of imparting the treated wood products with further strengthened wood treatment effects such as anti-organism properties, e.g., antimicrobial properties, microbicidal properties, antiseptic properties, insect-repellent properties, antiviral properties, and organism-repellent properties, wetherability, fire resistance, or abrasion resistance or to color wood, or for the purpose of imparting various wood treating effects simultaneously, the wood treating agent used in the present invention may also contain known chemical agents such as fragrances, deodorants, anticorrosives, antimicrobial agents, microbicidal agents, antiseptics, insect-repellent agents, antiviral agents, and organism-repellents.

Examples of such a chemical agent are extracts and extracted components derived from plants or synthesized substances having equivalent chemical structures to those of the plant extraction components. Specifically, mention may be made of plant extracts or extraction components obtained by treating the body of plants, such as trees, e.g., a Japanese cypress (hinoki), Aomori hiba (a variant of a Japanese cypress), herbs, mustard, horseradish, bamboo, iriomote thistle root, or yaeyama coconut, by pulverization, pressurization, boiling or steam distillation. Specific examples of the plant extract components and the synthesized substances having equivalent chemical structures to those of plant extraction components include tropolones such as hinokitiol and β-dolabrin, monoterpenes such as α-pinene, β-pinene, camphor, menthol, limonene, borneol, α-terpinene, γ-terpinene, α-terpineol, terpinen-4-ol, and cineole, sesquiterpenes such as α-cadinol, and t-murol, polyphenols such as catechin and tannin, naphthalene derivatives such as 2,3,5-trimethylnaphthalene, long chain aliphatic alcohol such as citronellol, aldehydes such as cinnamaldehyde, citral, and perillaldehyde, etc. Pyrolignous acid obtained by roasting wood can also be used. By adding these natural compounds as a chemical agent and further using plant-derived compounds such as lignin or lignin derivatives as a raw material for oxidation reaction and/or macromolecularization reaction, treated wood having high safety for environment and human body can be produced. The concentration of the extracts or the extracted components derived from plants, or synthetic substances having equivalent structures to those of the plant extraction components used in the present invention in a solution upon treating wood is 0.001 to 10 wt %, preferably 0.01 to 1 wt %.

Other chemical agents that can be used in the present invention are aromatic compounds or cyclic compounds having an OH group, an amino group, a halogen, a nitro group, a methyl group, a methoxy group, or the like as a substituent. Specific examples of such compounds include o-phenylphenol, 1-naphthol, 2-naphthol, o-chlorophenol, 2,4-dinitrophenol, 4,6-dinitro-o-cresol, pentachlorophenol, 2,3,5-trichlorophenol, 2,4,6-trichlorophenol, monochloronaphthalene, trichloronaphthalene, tetrachloronaphthalene, 2,4,5-trichlorophenyllaurate monochloronaphthalene, chloronitrophenol, chloronitrotoluene, o-dichlorobenzene, 1,3,5-trichlorobenzene, 1,2,4-trichlorobenzene, 2,4,6-tribromophenol, 4-bromo-2,5-dichlorophenol, bromo-o-phenyl phenate, 4-chlorophenyl-3-iodopropargylformal, creosote oil, chlorinated terpenes, p-hydroxybenzoic acid, methyl, ethyl, propyl, butylhydroxyanisole, butylhydroxytoluenenbutyl, isobutyl, isopropyl and the like esters of p-hydroxybenzoic acid, etc. The concentration of these compounds used in the present invention in a solution upon treating wood is 0.001 to 5 wt %, preferably 0.01 to 1 wt %.

Other chemical agents that can be used in the present invention are compounds that are automatically oxidized, for example, unsaturated fatty acids such as oleic acid and linolic acid, unsaturated alcohols such as oleyl alcohol, unsaturated alkyls such as squalene, drying oils such as tung oil, linseed oil, and castor oil, catechol derivatives having an unsaturated side chain, such as urushiol, and the like. By using these compounds together with the wood treating agent of the present invention, physical properties such as water solubility and water repellency of the treating solution or treated wood can be adjusted. The concentration of these compounds used in the present invention in a solution upon treating wood is 0.01 to 90 wt %, preferably 0.1 to 50 wt %.

The wood-treating agent of the present invention may be used with addition of many conventionally known fire retardants before it can be used. For example, mention may be made of phosphoric acid salts, hydrogen phosphoric acid salts, sulfuric acid salts, hydrogen sulfuric acid salts, carbonic acid salts, boric acid salts, silicic acid salts, nitric acid salts, fluorides, chlorides, bromides, hydroxides, etc., having in the cation moiety, elements such as Na, K, Mg, Ca, Ba, Al, Zn, Cu, Mn, Ni, Si, Sn, or Pb. Specific examples thereof include aluminum hydroxide, magnesium hydroxide, zirconium hydroxide, antimony trioxide, barium metaphosphate, tin oxide, red phosphorus, and ammonium phosphate. The concentration of the fire retardants used in the present invention in a solution upon treating wood is 0.01 to 90 wt %, preferably 1 to 50 wt %.

Inorganic compounds having strong anti-organism properties may also be added to the treating agent of the present invention before it could be used. Examples of the inorganic compounds include compounds containing boron, arsenic, antimony, selenium, bromine, iodine, fluorine, sulfur ion, or nitrate ion, and more specifically, boron-based compounds such as boric acid, boric acid salts, borax, fluoro boric acid salts, fluorosilicic acid salts, arsenious acid, antimony chloride, antimony trioxide, potassium selenate, calcium bromide, sodiumbromide, magnesiumbromide, potassiumbromide, zinc bromide, sodium iodide, zinc iodide, sodium fluoride, potassium fluoride, antimony fluoride, sodium silicofluoride, magnesium silicofluoride, sodium sulfide, potassium sulfide, zirconium nitrate, etc. The concentration of these compounds in the present invention in a solution upon treating wood is 0.01 to 500 mM, preferably 0.1 to 100 mM.

In the present invention, for the purpose of adjusting fixing property and sustained release of the metal, metal compound, and/or metal ion and other chemical agents and increasing anti-organism properties, quaternary ammonium compounds may be added to the treating agent before it can be used. Specifically, mention may be made of hydrochloric acid salts or sulfuric acid salts of quaternary ammonium having as a substituent group a hydrocarbon represented by $C_nH_{2n+1}$ (n=1 to 22), $C_nH_{2n-1}$ (n=2 to 22), $C_nH_{2n-3}$ (n=4 to 22), or $C_nH_{2n-5}$ (n=6 to 22), quaternary ammonium having as a substituent group an aromatic compound, quaternary ammonium having as a substituent group a hydrophilic polymer. DDAC (didecyldimethylammonium chloride) conventionally used may also be utilized, but those having as a substituent group an unsaturated structural moiety are more desirable. The concentration of the quaternary ammonium compounds used in the present invention in a solution upon treating wood is 0.001 to 50 wt %, preferably 0.01 to 20 wt %.

In addition to these chemical agents, various microbicides, insecticides or insect-repellent agents that are usually used may be added to the treating agent of the present invention before it can be used. Specifically, mention may be made of microbicide or microbicidal component belonging to triazole derivatives, sulfonamides, benzimidazoles, thiocyanates, morpholine derivatives, organic iodine compounds, organic bromine compounds, isothiazolines, benzisothiazolines, pyridines, dialkyl dithiocarbamates, nitriles, benzothiazoles, cyclodienes, nitrosos, quinolines, microbial agents having active ahalogen atom, formaldehyde producing substances, etc. Insecticide, insecticidal component, insect-repellent agent, or insect-repellent component belonging to organic phosphorus compounds, phosphoric esters, carbamates, pyrethroids, nitoroimino compounds, nitromethylene compounds and the like may also be added to the wood-treating agent of the present invention before it can be used.

Also, insect hormones or IGR (insect growth regulating substance) and derivatives thereof can be used. These microbicides, insecticides or insect-repellent agents may be used singly, or two or more of them may be used in combination. The concentration of the microbicides, insecticides or insect-repellent agents used in the present invention in a solution upon treating wood may desirably adjusted depending on the potency of physiological activity, solubility or the like that these chemicals have and is 0.0001 to 20 wt %, preferably 0.001 to 5 wt %.

Further, in the case where the compounds used by addition to the wood treating agent in the present invention have low water solubility, a method for forming O/W type or W/O type emulsions by addition of a dispersant or a surfactant is useful. As the surfactant used for such a purpose, many surfactants usually used can be used. Specifically, mention may be made of compounds such as sulfuric acid salts, aliphatic sulfonic acid salts, aromatic sulfonic acid salts, amido sulfuric acid salts, ether carboxylic acid salts, amides, esters, ethers, alcohols, phosphoric acid esters, phenyl ether, higher fatty acid alkanolamides, having a linear or branched chain alkyl or alkenyl structural moiety, and those compounds to which one or more components out of ethylene oxide, propylene oxide, and butylene oxide are added. Amino acid type surfactants, sulfonic acid type amphoteric surfactants, betaine type amphoteric surfactants, amine oxides, sucrose fatty acid esters, aliphatic glycerin monoesters, tetraalkylammonium type cationic surfactants can also be used. As for the dispersant, many conventionally known ones can be used. Furthermore, the lignin and/or lignin derivatives not only are raw materials for oxidation reaction and macromolecularization reaction but also these substances themselves have chemical agent dispersing effect so that chemical agents having low water-solubility can be used by addition to the treating agent during the production of treated wood articles of the present invention. Therefore, the present invention is extremely useful. In the case where the chemical agent is fine powder, powders having various particle sizes can be used. In the case where pressurization injection to wood is carried out,fine powder having a diameter of 5 $\mu$m or less, preferably 0.5 $\mu$m or less, more preferably 0.1 $\mu$m or less is desirably used.

For the purpose of adjusting fixing property of oxidation reaction product and/or polymerization reaction product to the metal, metal compound, and/or metal ions, physical properties, color tone, and the like thereof a plurality of the above-detailed compounds may be used in combination.

Further, a pH adjusting agent such as an organic acid, a natural or synthetic dye, pigment, a thickening agent, a polymeric compound, and a solid may be added, if desired, to the treating agent of the present invention before it can be used.

[Preparation Form]

The treating agent of the present invention used in the treatment of wood according to the present invention can be prepared in a form of either a high concentration solution that presupposes dilution upon use or a solution of such a concentration as can be used without dilution. In this case, to prevent the treating agent composition from being oxidized before use, it is desirable that the container containing the treating agent be sealed upon storage to prevent contact with open air. Upon production of the treating agent, it is more desirable that oxidation be prevented by use of nitrogen gas or inert gas or deaeration.

The treating agent used in the treatment of wood according to the present invention can be prepared as one pack by mixing the above composition and shaping it as powder or granulated powder. Granulation is conducted for the purpose of suppressing dust forming property or increasing storage stability and facility upon use, and specifically it can be achieved by any desired granulation operation depending on the purpose, such as marume granulation, extrusion granulation, flow granulation, centrifugal flow granulation, etc. In this case, to increase the storage stability of the polyphenol oxidizing catalyst in the treating agent, it is effective to granulate the catalyst separately from other treating agent components but together with a stabilizer. The granulated composition is dissolved in a solvent upon use and the solution is used in the same manner as the liquid treating agent described above.

Examples of diluent or solvent include water, dichloromethane, etc.

In the preparation of the treating agent in the present invention, it is possible to separately prepare a first agent containing a metal, a metal compound, and/or a metal ion and a second agent containing lignin and/or lignin derivatives and mix them immediately before use.

That is, the first and second agents are retained in a state they do not contact and mix with each other before treating wood, that is during storage. Upon treating wood, the first and second agents are mixed in suitable amounts and further dissolution operations such as dilution and stirring maybe performed, if desired.

Upon mixing the first and second agents, formation of a complex between the metal component and the lignin component and oxidation reaction of the lignin component will start. At this time, substantially no formation of insoluble product occurs. Therefore, the treating liquid containing the both components can be smoothly injected into, impregnated to or coated on the object to be treated. Thereafter, during the drying process of the treated wood, the chemical agent components are concentrated and exposed to oxygen, thereby accelerating a series of the above reactions. As a result, a complex of the product by the oxidation and/or macromolecularization reaction of lignin component with the metal compound and/or metal ion is produced and the metal component is firmly fixed to the surface and inside of the wood.

The first and second agents not only are stable in a stored state before mixing but also can be preserved for a certain period of time after the mixing. Due to this property, the metal-containing treating agent, though in the form of two-pack type preparation, does not need to be used in separate steps for individual agents. In other words, the object article can be treated with a one-pack treating liquid composed of a mixture of the both agents. This results in a simplified operational procedure and conventional equipment for one-pack type treating agents can be utilized. Also, treating liquid once used can be used repeatedly for treating a plurality of articles.

Preferably, the first agent containing a metal, a metal compound, and or a metal ion as described above contains an organic alkalizing agent.

Here, the organic alkalizing agent is any compound that has an ability of solubilizing metals and usually is a basic organic compound that forms a salt or chelating complex with a metal ion and is an amine or imine having at least one hydroxyl group in the molecule, or compounds having two or more amino group or imino group in the molecule (the hydrogen atoms in these groups may be substituted). As the organic alkalizing agent that has high dissolving power for metal compounds and allows preparation of stable metal compound solutions in high concentrations, alkylamines and alkanolamines are used advantageously. As such a compound, specifically, mention may be made of monoethanolamine, diethanolamine, triethanolamine, ethylenediamine, etc. A plurality of these compounds can be used as admixtures depending on the necessity of increasing the stability of solutions and adjusting the fixing property of metal compounds.

The content of the organic alkalizing agent in the first agent is determined depending on the kind of the metal compound and its content, etc. For example, depending on a kind of alkalizing agent though, with divalent metal salts, need about 0.5 to 5 times amount (by mole) for monoethanolamine and about 0.1 to 5 times amount (by mole) for ethylenediamine compared to divalent metal salts.

The first agent may if desired contain a solvent, a pH adjusting agent, or other components. The solvent is not limited particularly so far as it can dissolve the above metal compound in the co-presence of the organic alkalizing agent. For example, water, dichloromethane, etc. may be mentioned of. As the pH adjusting agent, inorganic acids or organic acids, ammonia, the above organic alkalizing agents, referred to above in relation to the metal compounds may be used.

The first agent may be formulated as a solution or suspension using the solvent as described above. It may be prepared also as powder or granules. Granulation is shaping conducted for the purpose of suppressing dust forming property or increasing storage stability or facility upon use (depending on a purpose), it can be achieved by any desired granulation operation depending on the purpose.

The second agent contains lignin and/or lignin derivatives. Use of other phenolic compounds instead of lignin and/or lignin derivatives can give rise similar effects.

Here, the phenolic compound may be any compound so far as it can be oxidized or oxidativelly macromolecularized with an oxidizing agent such as air, oxygen, hydrogen peroxide, or the like. The metal or metal compound is fixed more firmly by oxidation and/or macromolecularization. Here, the macromolecularization reaction of the phenolic compound includes polymerization or oxidative polymerization of the phenolic compound and its reaction with the polyphenol components in wood in the case where the object to be treated is wood.

In particular, compounds having a plurality of hydroxyl groups on the ortho or para positions on the aromatic ring can be used advantageously for the purpose of the present invention. Specific examples of phenolic compound include pyrocatechol, hydroquinone, pyrogallol, gallic acid, tannin, tannic acid, ferulic acid, lignin, lignosulfonic acid, and compounds converted into their derivatives.

For the purpose of adjusting physical properties, color tone, metal fixing property, etc. of oxidation reaction and/or macromolecularization reaction product, a plurality of the above-detailed compounds may be used in combination.

The content of the phenolic compound in the first agent and/or second agent is not limited particularly and is usually within the range of 0.1 to 100%.

For the purpose of strengthening or adjusting the effect of the metal-containing treating agent or adding some effect on treatment of articles, the second agent may further contain chemical agents such as fragrances, deodorants, anticorrosives, fire retardants, antimicrobial agents, antiseptics, microbicidal agents, insect-repellent agents, antiviral agents, and organism-repellents. Examples of such a chemical agent includes as inorganic compounds boron compounds including boric acid, borax, etc.; halides such as iodides and fluorides, as organic compounds various extracted components of natural substances, such as tropolones and terpenoids, and synthetic compounds having equivalent structures to these natural substances; organic microbicides such as triazoles, thiocyanates; organic insecticides such as pyrethroids and phosphoric acid esters; quaternary ammonium salts such as didecyldimethylammonium chloride (DDAC) and benzalkonium chloride, etc.

In the case where the compounds used by addition for the above purpose have low water solubility, a method for forming an emulsion by addition of a dispersant or surfactant is useful in order to increase stability, permeability into the object to be treated and spreadability of the agent.

Further, pH adjusting agent such as inorganic alkalis, natural or synthetic dyes, pigments, thickening agents, high molecular compounds, solids, etc. may if desired be added to the treating agent of the present invention before it can be used.

These chemical agents may be mixed with the first agent above.

The second agent may take any of solution, powder, and granular forms. The solvent is not particularly limited so far as it is miscible with the phenolic compounds, For example, water, dichloromethane, etc. can be mentioned of. To prevent the treating agent components in the second agent from being oxidized before use, it is desirable that the container containing the treating agent be sealed upon storage to prevent contact with open air. Upon production of the treating agent, it is also advantageous that oxidation be prevented by use of nitrogen gas or inert gas or deaeration. The granulation method is not limited particularly.

The first agent and/or second agent may further contain the above polyphenol oxidizing catalyst, if needed.

The above two-pack type metal containing treating agent is provided in a state where the above first agent and second agent are separated and so far as these two agents are retained in separate state, it can be prepared and provided in any method.

In the simplest form, two-pack type chemical agent is provided with the first and second agents being contained in separate containers. In this case, each agent may be contained in a container having any desired volume of contents or when the object to be treated is fixed, it may be divided into aliquots each of a predetermined amount and contained in each container depending on the dosage. Alternatively, it is preferred to use containers that discharge always a fixed amount of the treating agent for retaining the first and second agents, respectively.

For example, the first and second agents may be contained in a container having a partition wall or partition membrane inside thereof so that they do not mix with each other. In this case, by having predetermined amounts of the respective agents retained in the container and rupturing or removing the partition wall or partition membrane, the first and second agents can be mixed always at the ratio set up upon its production.

The above two-pack type metal containing treating agent may be provided in the form of three-pack type or more. For example, additive chemical agents explained in respect of the second agent may be a separate agent and separately added during preparation of the treating liquid. In the case where an oxidizing catalyst is contained as a component, it is effective to formulate a solution of the catalyst separately from other treating agent components or granulate it together with a stabilizing agent in order to increase the storage stability of polyphenol oxidizing catalyst in the treating agent.

(III) Treating Method

The treatment of wood according to the present invention is practiced by impregnating wood with the above treating agent solution.

In the case where the above two-pack type metal-containing treating agent is used, the above first and second agents (and other components optionally added) are added to form a treating liquid and the obtained treating liquid is impregnated to wood as described later on. Here, the mixing ratio of the first and second agent is determined depending on the components of the chemical agent and the kind and shape of the object to be treated. Usually, it is within the range of 1:99 to 99:1, preferably 5:95 to 95:5. It may be diluted, if needed, before or after mixing. As the diluent, water or dichloromethane can be used.

In a solution upon treating articles contain respective components in a concentration of the metal component (for example, copper, zinc, or silver): 0.01 to 500 mM, more preferably 0.1 to 100 mM, and the organic alkalizing agent: 0.001 to 50 wt %, more preferably 0.01 to 30 wt %, and the phenolic compounds: 0.001 to 50 wt %, more preferably 0.01 to 30 wt %, and in the case where it contains the polyphenol oxidizing catalyst, its oxidation activity concentration is 1 to 100,000 U/liter, more preferably 10 to 5,000 U/liter.

The impregnation operation can be practiced simply by dipping an article in the treating agent solution. It can be practiced also by coating with a brush or roller, blowing operation using a sprayer or aerosol for wood that is easy to impregnate. However, as the impregnation operation for injecting a sufficient amount of treating liquid into wood that is difficult to be impregnated, pressurization and/or pressure reduction operations are extremely useful. The pressurization operation is practiced by pressurizing from outside the wood in a state where the wood and the treating agent solution is in contact with each other by applying a pressure within the range of 1 atm, which is atmospheric pressure, to 20 atm, more desirably 3 to 15 atm. In the case where polyphenol oxidizing catalyst is not used, or even it is used, a higher pressure may be applied within the range where the activity of the polyphenol oxidizing enzyme is not lost.

The pressure reduction operation can be practiced at any pressure within the range down to vacuum, but it is desirable to use reduced pressure within the range of 100 to 760 mmHg for effective treatment of wood that is difficult to impregnate. The pressure reduction operation is more desirably a pre-exhaustion process that practices pressure reduction before the wood and treating liquid contact with each other.

It is also effective to practice the pressurization operation and pressure reduction operation in combination in order to impregnate wood with a larger amount of treating liquid.

By using a method in which after wood is impregnated with the treating liquid, a pressure reduction treatment is carried out to recover a part of the treating liquid to the outside the wood or by washing wood with water or the like before polymerization reaction in the inside of wood proceeds sufficiently to remove non-polymerized matter, so the degree of porosity retention can be readily adjusted. The wood whose porosity has been retained or adjusted retains humidity adjusting capability, water retention power, adsorptivity, ion exchange capacity, and wood surface texture, and finds application to various uses making the best of these capabilities and texture. The porosity-retained wood may be further impregnated with a chemical agent, polymer, prepolymer to produce treated wood articles having various composite properties.

As the method for pressurization and/or pressure reduction, various treating methods usually used can be practiced. Specifically, full cell process (Bethell process), semi-empty cell process (Lowery process), empty cell process (Rüping process), double vacuum process, oscillating pressure method, pulsation pressure method, constant pressure method, slow pressure change method, and methods combining these operations can be applied. Incising processing method can also be applied to increase the amount of impregnation. As a pretreatment for wood that is difficult to impregnate, it is effective to conduct compression treatment using rollers, micro wave heating, freezing treatment, cooking treatment, steaming treatment or heat treatment.

In the wood treating method of the present invention, the operation of impregnating wood with the treating agent is practiced at 0 to 150° C., preferably 10 to 100° C. After such a treatment, carrying out curing operation by leaving the treated product to stand in air or oxygen gas to dry it slowly so that oxidation reaction and/or macromolecularization reaction makes it possible to fix the metal, metal compound, and/or metal ion more firmly. Upon curing, carrying out heating makes it possible to fix the metal, metal compound, and/or metal ion more efficiently.

The heating upon curing is practiced under the temperature conditions of 20 to 300° C., more preferably 40 to 150° C. In the case where wood treatment is carried out with the treating agent containing a polyphenol oxidizing catalyst, it is desirable that heating is performed at a temperature at which the catalytic ability of the polyphenol oxidizing catalyst can be developed effectively.

By such a heating treatment, the metal, metal compound, and/or metal ion can be efficiently fixed in a shorter time. Also pressurizing the article which is treated upon curing is useful to closely adhere the tissue of the wood in order to further increase the degree of retention of the metal, metal compound, and/or metal ion and the strength of wood. Coating the surface of the wood after such a treatment is effective to seal the treating agent composition of the metal, metal compound, and/or metal ion or its constituent components. In particular, carrying out the oxidation treatment and/or macromolecularization treatment on the surface of the article after the treatment can fix the treating agent components more firmly by utilizing the lignin and/or lignin derivatives contained in the treating agent.

The pH of the treating agent solution used in the production of treated wood product according to the present invention may be in any pH range, so far as the objective oxidation reaction and/or macromolecularization reaction proceeds. In the case where no polyphenol oxidizing catalyst is used, or in the case where a metal complex or artificial enzyme is used, generally, the oxidation reaction proceeds more rapidly in alkaline condition. However, in the case where polyphenol oxidizing enzyme is used as a catalyst, it is desirable that the pH of the treating agent be adjusted at which oxidation reaction and/or macromolecularization reaction can proceed more efficiently taking in consideration an increase in the auto-oxidation in alkaline pH ranges and pH-dependent change of enzymatic reaction rate putting together. Usually, a pH of about 7 to 12 is preferred and about 7.5 to 12 is more preferred in most cases.

[Treated Wood]

The wood to which the method of the present invention can be applied includes boards and poles. Therefore, according to the present invention, treated wood such as various boards and poles subjected to metal-containing treatment can be produced.

The wood that can be treated by the present invention includes various woody materials.

Examples of the woody materials include laminated lumber, single plate laminate, plywood, a particleboard, a fiberboard, or raw materials thereof. Therefore, according to the present invention, a wide variety of such woody materials as above subjected to metal-containing treatment can be produced.

In the case where producing treated wood products according to the present invention is utilized to the above woody material using an adhesive (woody processed products such as laminated lumber), it is useful to incorporate the method for producing treated wood product according to the present invention as a part of the production process for the woody processed article itself. For example, upon production of laminated lumber, first the method for producing the treated wood product of the present invention is practiced to a stripped plate or small square timber, followed by longitudinal joining, stripping, coating of an adhesive, and then compression and hardening so that a laminated lumber impregnated with a sufficient amount of a treating agent can be produced. The treated wood product of the present invention maintains properties necessary for the production of woody processed articles, such as processability and adhesiveness and is extremely useful in the production of such woody processed articles.

Since the treated wood product produced by the method of present invention contains the phenolic compound and/or aromatic amine compound having resistance to oxygen in the wood, the treated wood has an effect against corrosion if iron nails or the like corrosive parts are brought in contact therewith so that it is also useful for maintaining the strength of the construction.

Inhibition of the oxidation reaction and/or macromolecularization reaction in the treating agent before treating wood makes it possible to cause macromolecularization reaction to proceed mainly in the inside of the wood. That is, a large amount of treating liquid can be readily impregnated inside of wood by use of a treating agent in a state where the molecular weight of the substances constituting the reaction mixture composition is relatively low, i.e., in a state where the viscosity is relatively low. In addition, the oxidation reaction and/or macromolecularization reaction after the impregnation can effectively fix the treating agent components. In the wood, lignin, flavonoids and the like substances, on which the catalyst having polyphenol oxidizing effect can act, already exist in a fixed state and they macromolecularize with the phenolic compound and/or aromatic amine compound by catalytic effect in the wood, resulting in that the phenolic compound and/or aromatic amine compound can be fixed in the wood more firmly.

Termination of the reaction at the time when the oxidation and/or macromolecularization in the wood has proceeded to a suitable level can be practiced by impregnation of an acid such as hydrochloric acid, sulfuric acid, nitric acid, phosphoric acid, boric acid, carbonic acid, and organic acid and the like, or cut-off of the supply of oxygen by coating on the surface of wood or wrapping it with a film. In the case where the polyphenol oxidizing catalyst is an enzyme that has a polyphenol oxidizing effect, the termination of the reaction can be effectively practiced by impregnation with an alkali or alkaline salts such as NaOH, $NH_3$, $Na_2CO_3$, $CaCO_3$, impregnation with a conventional enzyme inhibitor, or heating treatment that is conducted, for example, at 100° C. for 15 minutes.

In many methods for treating wood that have been practiced heretofore and in which the problem of leaching of treating agent components has arisen, carrying out the treatment using the treating agent of the present invention as a post treatment, pretreatment, or simultaneous treatment can increase the fixing property of components contained in the conventional treating agent that are readily leached.

BEST MODE FOR CARRYING OUT THE INVENTION

Hereinafter, typical examples of the present invention will be shown for illustrating the invention more concretely. However, these are merely exemplary and the present invention should not be construed as being limited thereto. In the following examples, all "%" are wt % unless otherwise indicated specifically.

In the present invention, the assay of the polyphenol oxidizing activity of enzyme protein having a polyphenol oxidizing effect was done by carrying out the reaction at 25° C. and at the optimal reaction pH in an Tris-HCl buffer or potassium phosphate buffer solution(100 mM) containing syringaldazine(20 ppm) and measured absorption at 525 nm. The amount of activity to oxidize 1 μmol of syringaldazine in 1 minute was defined as 1 unit (hereinafter, abbreviated as "U").

EXAMPLE 1

Obtention of Polyphenol Oxidase

To obtain an enzyme used as a polyphenol oxide catalyst in the present invention, *Myrothecium verrucaria* SD3001 (Accession Number FERM BP-5520) was inoculated in a culture tank containing 3 liters of a culture medium consisting of glucose (0.5%), $NaNO_3$ (0.1%), $Na_2HPO_4 \cdot 12H_2O$ (1.34%), $KH_2PO_4$ (0.3%), NaCl (0.1%), peptone (0.2%), yeast extract (20 ppm), $MgSO_4 \cdot 7H_2O$ (0.01%), and $CuSO_4$ (0.1 mM), to which was added 10% NaOH to render pH 8, and incubated at 28° C. for 3 days with shaking. After the incubation, the culture was centrifuged at 4° C. to obtain 2.5 liters of culture broth from which mould cells were removed.

Then a part of the culture broth was concentrated by Minitan Ultrafiltration System (manufactured by Millipore Corp.) using Minitan Filter Packet (CAT. NO.: PTGCOMP04, manufactured by Millipore Corp.) as a fraction of a molecular weight of more than 10,000.

Further, this was dialyzed against $NH_4HCO_3$ (200 ppm) and then freeze-dried to obtain the target enzyme as a crude purification product. The polyphenol oxidase activity of this enzyme preparation was 10 U/mg.

EXAMPLE 2

Preparation of Wood Treating Agent and Treatment of Wood

To an alkali digested solution of pulp (100 ml) were added monoethanolamine (1.5 g) and copper(II) sulfate pentahydrate (2.5 g). Sodium hydroxide was added thereto and dissolved to adjust the pH of the solution to 10, thus obtaining a wood treating agent solution.

Using this treating agent solution, impregnation treatment was carried out to a Japan cedar block (2 cm×2 cm×1 cm, butt end was 2 cm×2 cm, sapwood). The impregnation operation was performed by dipping the Japan cedar block in the treating liquid and then subjecting it to pressure reduction at 650 to 700 mmHg for 30 minutes, followed by leaving it to stand in a dipped state at normal pressure for 30 minutes. Injection of a sufficient amount of the treating liquid (3.0 to 3.4 g amounts) was confirmed by measuring the weight of the block before and after the impregnation operation.

Further, the block after the impregnation treatment was placed in a 200-ml glass beaker, which was then capped with an aluminum foil. The beaker was heat treated at 120° C. for 2 hours using an autoclave for pressure sterilization and then placed in an incubator at 60° C. for 2 days to carry out drying and reaction to obtain a treated block (block A). Then, 40 ml of water was added to the treated block to submerge it and stirring was conducted at 25±3° C. for 8 hours using a magnetic stirrer by rotating its stirring rod to carry out leaching operation. Then, the water after the leaching operation (leached solution) was subjected to formation of a complex with PAN (1-(2-pyridylazo)-2-naphthol, obtained from Aldrich Chemical Company), and absorption analysis of leached copper ion amount was conducted. Taking the amount of impregnated copper as 100%, calculation of the residual amount of copper in the wood gave 69%. As a control, the same treating agent as above except without including alkali-digested liquid of pulp was prepared and the same block treatment was conducted. The residual amount of metal in the wood revealed to be 58%, which indicated that the method for treating wood according to the present invention improved the fixing property of metal ion.

EXAMPLE 3

Preparation of Wood Treating Agent and Treatment of Wood

To lignosulfonic acid (obtained from Aldrich Chemical Company) (40g) were added $H_2O$ (60ml), pyrocatechol (3g), 37% formalin (3 g) and concentrated sulfuric acid (2 ml). This was refluxed at 85° C. for 1 hour. Further, sodium carbonate was added to adjust pH to 7.5. The obtained liquid having a blackish brown and viscous appearance was stored at 4° C. in a glass bottle in a sealed state.

Then, to this liquid (5 g) were added monoethanolamine (1.4 g) and copper(II) sulfate pentahydrate (2.5 g). Water and boric acid were added thereto for dissolution to adjust pH to 9 to obtain 100 ml of a wood treating agent solution. With this treating agent solution, the same impregnation operation, drying and reaction as in Example 2 were carried out to obtain a treated block (block B), and further the same leaching treatment and analysis of the amount of leached copper ion as in Example 2 were carried out. Taking the amount of impregnated copper as 100%, the residual amount of copper in the wood was calculated to be 88%, which indicated that the method for treating wood according to the present invention improved the fixing property of metal ion.

EXAMPLE 4

Preparation of Wood Treating Agent and Treatment of Wood

A lignosulfonic acid derivative was synthesized in the same manner as in Example 3 except that ferulic acid was used in place of pyrocatechol used in Example 3. Then a wood treating agent solution was prepared in the same manner as in Example 3; and further, a treated block (block C) was obtained by carrying out the same impregnation operation, drying and reaction as in Example 2. Further, the same leaching treatment and analysis of the amount of leached copper ion as in Example 2 were carried out. Taking the amount of impregnated copper as 100%, the residual amount of copper in the wood was calculated to be 92%, which indicated that the method for treating wood according to the present invention improved the fixing property of metal ion.

EXAMPLE 5

Preparation of Wood Treating Agent and Treatment of Wood

To lignosulfonic acid (2 g) were added monoethanolamine (1.4 g) and copper(II) sulfate pentahydrate (2.5 g). Water and boric acid were added thereto for dissolution to adjust pH to 9. Further, 2 mg of the polyphenol oxidase obtained in Example 1 was added to obtain 100 ml of a wood treating agent solution.

With this treating agent solution, the same impregnation operation as in Example 2 were carried out to obtain a treated block (block D) provided that the drying and curing (reaction) after the impregnation were carried out by standing in an incubator at 28° C. for 4 days. Further, the same leaching treatment and analysis of the amount of leached copper ion as in Example 2 were carried out. Taking the amount of impregnated copper as 100%, the residual amount of copper in the wood was calculated to be 97%, which indicated that the method for treating wood according to the present invention improved the fixing property of metal ion.

As a control, the same treating agent as above except without including the polyphenol oxidase was prepared and the same treatment was conducted to the block. The residual amount of metal in the wood revealed to be 55%, which indicated that the method for treating wood using polyphenol oxidizing catalyst according to the present invention improved the fixing property of metal ion even if curing and drying were conducted at a lower temperature.

EXAMPLE 6

Preparation of Wood Treating Agent and Treatment of Wood

A lignosulfonic acid derivative was synthesized in the same manner as in Example 3 except that gallic acid was used in place of pyrocatechol used in Example 3. Then a wood treating agent solution including polyphenol oxidase was prepared in the same manner as in Example 5; and further, a treated block (block E) was obtained by carrying out the same impregnation operation, drying and curing (reaction) as in Example 5. Further, the same leaching treatment and analysis of the amount of leached copper ion as in Example 5 were carried out. Taking the amount of impregnated copper as 100%, the residual amount of copper in the wood was calculated to be 89%, which indicated that the method for treating wood according to the present invention improved the fixing property of metal ion.

EXAMPLE 7

Preparation of Wood Treating Agent and Treatment of Wood

A wood treating agent solution was prepared in the same manner as in Example 3 except that zinc sulfate-heptahydrate (2.8 g) and monoethanolamine (5.0 g) or nickel(II) chloride.hexahydrate (2.3 g) and monoethanolamine (3.3 g) were used in place of copper(II) sulfate pentahydrate and monoethanolamine used in Example 3, with this wood treating agent solution, treated blocks (blocks F and G, respectively) were obtained by carrying out the same impregnation operation, drying and reaction as in Example 3. Further, the same leaching treatment as in Example 3 was carried out. The aqueous solution containing leached metal was analyzed on the amount of leached metal by high frequency plasma emission spectroscopic analysis (ICP method) using ICAP-575II of Nippon Jarrell-Ash Co., Ltd. Taking the amount of impregnated metal as 100%, the residual amount of the metal in the wood was calculated to be 86% for zinc and 90% for nickel, which indicated that the method for treating wood according to the present invention could fix various metal ions.

EXAMPLE 8

Preparation of Wood Treating Agent and Treatment of Wood

To lignin (Organosolve) (obtained from Aldrich Chemical Company)(20 g) were added tetrahydrofuran (50 g), concentrated sulfuric acid (50 µl), and poly(propylene glycol) diglycidyl ether (average Mn is about 380, obtained from Aldrich Chemical Company) (1.5 g). This was refluxed at about 80° C. for 2 hours. Further, monoethanolamine (0.1 ml) was added and then evaporation was carried out to obtain a liquid having a blackish brown and viscous appearance.

Then, to this liquid (5 g) were added monoethanolamine (1.4 g), copper(II) sulfate pentahydrate (2.5 g), and pyrogallol (0.5 g). Water and boric acid were added thereto for dissolution to adjust pH to 9. Further, 2 mg of the polyphenol oxidase obtained in Example 1 was added thereto to obtain 100 ml of a wood treating agent solution. With this treating agent solution, the same impregnation operation, drying and curing (reaction) as in Example 5 were carried out to obtain a treated block (block H), and further the same leaching treatment and analysis of the amount of leached copper ion as in Example 5 were carried out. Taking the amount of impregnated copper as 100%, the residual amount of copper in the wood was calculated to be 88%, which indicated that the method for treating wood according to the present invention improved the fixing property of metal ion. At the same time, it revealed that lignin and polypropylene glycol derivatives were fixed well in the wood so that substantially no coloring was observed in the leached solution.

EXAMPLE 9

Preparation of Wood Treating Agent and Treatment of Wood

To the wood treating agent solution prepared in the same manner as in Example 3 was added hinokitiol, an auxiliary anti-organism and chelating agent, in a concentration of 100 ppm. And a treated block (block I) was obtained by carrying out the same impregnation operation, drying and reaction as in Example 2. Further, the same leaching treatment and analysis of the amount of leached copper ion as in Example 2 were carried out. Taking the amount of impregnated copper as 100%, the residual amount of copper in the wood was calculated to be 89%, which indicated that the method for treating wood according to the present invention improved the fixing property of metal ion.

EXAMPLE 10

Antiseptic Test on Treated Wood Products

Block samples (samples A' to I') prepared in the same manner as in the treated blocks (blocks A to I) prepared in Example 2 to 9 were placed in a drier at 60° C. for 48 hours and then in a desiccator for 30 minutes to dry sufficiently. Then, their dry weight was measured. Next, antimicrobial tests on these blocks were practiced according to JIS A 9201 (Performance standard for wood antiseptics and test method, 1991) using *Tyromyces palustris* FFPRI 0507 (obtained from Forest General Research Institute, Ministry of Agroforestry and Fishery). After the antimicrobial tests each block was taken out of the incubation bottle. The hyphae on the surface of the block were removed sufficiently. The block was air-dried for about 24 hours and then dried sufficiently using a drier and dessicator as described above before measuring the weight. The weight decrease ratio of the block was calculated. As a result, it revealed that the method for treating wood according to the present invention could effectively impart wood with antimicrobial property. The results are shown in Table 1.

TABLE 1

| Sample | Ratio of weight decrease (%) | Sample | Ratio of weight decrease (%) |
|---|---|---|---|
| A' | 6.5 | F' | 3.0 |
| B' | 2.8 | G' | 2.4 |
| C' | 2.0 | H' | 2.1 |
| D' | 1.3 | I' | 1.1 |
| E' | 2.7 | Control | 31.1 |

EXAMPLE 11

Treatment of Article with an Anti-organism Agent and Tests on Ant-proofing Property Using the treating agent solution used for preparing the block D in Example 5 (treating agent a) and the treating agent solution used for preparing the block I in Example 9 (treating agent b), ant-proofing efficacy tests (general tests) prescribed in Standard No. 12 of Japan Wood Preservation Association (body corporate) (1992) were practiced. The results are as shown in Table 2, which indicated that the method for treating wood according to the present invention could effectively impart wood with ant-proofing property.

Note that the wetherability operation was based on the above standard and carried out by repeating 10 times a series of operations consisting of dipping the chemical agent-treated block in static water for 30 seconds, leaving it to stand in a desiccator kept for 4 hours at 26° C. with water contained on the bottom, and then drying it for 20 hours in an incubator with circulation.

TABLE 2

| Treating Agent | Test Conditions | Average ratio of weight Decrease (%) |
|---|---|---|
| a | Wetherability operation was done | 2.1 |
|   | Wetherability operation was not done | 1.9 |
| b | Wetherability operation was done | 1.5 |
|   | Wetherability operation was not done | 1.3 |
| No treatment | Wetherability operation was not done | 23.7 |

EXAMPLE 12

Preparation of Metal Containing Treating Agent

A metal-containing treating agent A consisting of the following first and second agents was prepared.

First agent: 100 ml of a solution at pH 8.5 was prepared by addition of distilled water and lactic acid to copper(II) sulfate pentahydrate (12.5 g) and ethylenediamine (4.5 g).

Second agent: 100 ml of a solution at pH 8.5 was prepared by addition of distilled water and sodium hydroxide to lignosulfonic acid (20 g) (obtained from Aldrich Chemical Company) and the enzyme (0.01 g) (freeze-dried preparation) obtained in Example 1.

Similarly, first and second agents containing active ingredients in the ratio shown in Tables 3 to 5 were each prepared and metal-containing treating agents B to U constituted by the combinations shown in the tables was prepared. Adjustment of pH was performed in the same manner as above to obtain solutions at pH 8.5, respectively. The metal containing treating agents A, C, E, G, H to R, and T are Example of the present invention and B, D, F, S and U (each lacking the second agent) are comparative examples.

The first and second agents of the metal containing treating agents A to U thus obtained were each placed in a glass vial of about 120 ml in a total inner volume and sealed. This was subjected to stability tests by standing at 40° C. for 3 weeks. As a result, no instabilization of the liquid, such as precipitation or coagulation, was observed.

TABLE 3

Components of metal-containing treating agent

| | Components | Composition of Anti-organism Agent* | | | | | | |
|---|---|---|---|---|---|---|---|---|
| | | Agent A | Agent B | Agent C | Agent D | Agent E | Agent F | Agent G |
| 1st agent | Copper sulfate.5H$_2$O | 12.5 | 12.5 | 25 | 25 | — | — | — |
| | Copper hydroxide | — | — | — | — | 20 | 20 | 20 |
| | Monoethanolamine | — | — | 15 | 15 | 30 | 30 | — |
| | Triethanolamine | — | — | — | — | — | — | 24 |
| | Ethylenediamine | 4.5 | 4.5 | — | — | — | — | — |
| 2nd agent | Lignosulfonic acid | 20 | — | 10 | — | 20 | — | 20 |
| | Oxidation-reduction catalyst | 0.01 | — | 0.02 | — | 0.04 | — | 0.04 |

*The values in this table indicate the content (g) of components per 100 ml each of the first or second agent. In each case, the balance is solvent (water).

TABLE 4

Components of metal-containing treating agent

| | | Composition of Anti-organism Agent* | | | | | | |
|---|---|---|---|---|---|---|---|---|
| | Components | Agent H | Agent I | Agent J | Agent K | Agent L | Agent M | Agent N |
| 1st agent | Copper hydroxide | 10 | 10 | 20 | 20 | 20 | 20 | 1 |
| | Monoethanolamine | 15 | 15 | 30 | 30 | 15 | 15 | 1.5 |
| | Triethanolamine | — | — | — | — | 12 | 12 | — |
| 2nd agent | Lignosulfonic acid | 50 | — | 10 | — | 20 | — | 1 |
| | Pyrogallol | — | 12.5 | — | 2.5 | — | 5 | — |
| | Oxidation-reduction catalyst | 0.1 | — | 0.02 | — | 0.04 | 0.04 | 0.01 |

*The unit of values in table is the same as in Table 1.

TABLE 5

Components of metal-containing treating agent

| | | Composition of Anti-organism Agent* | | | | | | |
|---|---|---|---|---|---|---|---|---|
| | Components | Agent O | Agent P | Agent Q | Agent R | Agent S | Agent T | Agent U |
| 1st agent | Copper hydroxide | 20 | 20 | 20 | — | — | — | — |
| | Zinc sulfate.7H$_2$O | — | — | — | 30 | 30 | — | — |
| | Silver (I) chloride | — | — | — | — | — | 15 | 15 |
| | Monoethanolamine | 30 | 30 | 30 | 20 | 20 | 20 | 20 |
| 2nd agent | Pyrogallol | 5 | 5 | — | 5 | — | 10 | — |
| | Gallic acid | — | — | 25 | — | — | — | — |
| | Oxidation-reduction catalyst | — | 0.04 | 0.04 | — | — | — | — |

*The unit of values in table is the same as in Table 1.

EXAMPLE 13

Anti-organism Treatment

The first and second agents of metal-containing treating agent prepared in Example 12 and water were mixed in ratios shown in Tables 6 to 8 to prepare treating liquid (named treating liquid 1 to 21 in order) and impregnation treatments therewith were carried out on Japanese cedar blocks (2 cm×2 cm×1 cm, butt end was 2 cm×2 cm, sapwood). The impregnation operation was performed by dipping the Japan cedar block in the treating liquid and then subjecting it to pressure reduction at 650 to 700 mmHg for 10 minutes, followed by leaving it to stand in a dipped state at normal pressure for 10 minutes. Injection of a sufficient amount of the treating liquid (3.0 to 3.4 g in amounts) was confirmed by measuring the weight of the block before and after the impregnation operation.

Further, the blocks a to u after the impregnation treatment were placed in an incubator at 28° C. for 5 days to carry out drying and metal fixing reaction. Then, 40 ml of water was added to the treated block to submerge it and stirring was conducted 25±3° C. for 8 hours using a magnetic stirrer by stirring rod to carry out leaching operation. The aqueous solution containing leached metal was analyzed on the amount of leached metal by high frequency plasma emission spectroscopic analysis (ICP method) of element using ICAP-575II of Nippon Jarrell-Ash Co., Ltd. The residual amount of metal in the sample wood was measured. Taking the amount of impregnated metal as 100%, the ratio of metal fixing (%) was calculated.

The results obtained are shown in the lowermost column in Tables 6 to 8. It revealed that the use of the second agent containing a phenolic compound in combination considerably improved metal ion fixing ratio as compared with the treating liquids containing no such second agent.

TABLE 6

Metal-containing treatment of wood block

| Sample Wood Block | | a | b | c | d | e | f | g |
|---|---|---|---|---|---|---|---|---|
| Treating Liquid Number | | 1 | 2 | 3 | 4 | 5 | 6 | 7 |
| Treating Liquid* | Metal-containing Treating agent | Agent A | Agent B | Agent C | Agent D | Agent E | Agent F | Agent G |
| | First agent | 10 | 10 | 5 | 5 | 2.5 | 2.5 | 2.5 |
| | Second agent | 10 | — | 5 | — | 2.5 | — | 2.5 |
| | Water | 80 | 90 | 90 | 95 | 95 | 97.5 | 95 |
| Metal ion fixing ratio (%) | | 93 | 40 | 95 | 52 | 95 | 47 | 91 |

*The constitution of treating liquid is shown in mixed amount (ml) per 100 ml.

TABLE 7

Metal-containing treatment of wood block

| Sample Wood Block | | h | i | j | k | l | m | n |
|---|---|---|---|---|---|---|---|---|
| Treating Liquid Number | | 8 | 9 | 10 | 11 | 12 | 13 | 14 |
| Treating Liquid* | Metal-containing Treating agent | Agent H | Agent I | Agent J | Agent K | Agent L | Agent M | Agent N |
| | First agent | 5 | 5 | 2.5 | 2.5 | 2.5 | 2.5 | 50 |
| | Second agent | 1 | 1 | 5 | 5 | 2.5 | 2.5 | 50 |
| | Water | 94 | 94 | 92.5 | 92.5 | 95 | 95 | — |
| Metal ion fixing ratio (%) | | 95 | 93 | 94 | 91 | 90 | 89 | 94 |

*The constitution of treating liquid is shown in mixed amount (ml) per 100 ml.

TABLE 8

Metal-containing treatment of wood block

| Sample Wood Block | | o | p | q | r | s | t | u |
|---|---|---|---|---|---|---|---|---|
| Treating Liquid Number | | 15 | 16 | 17 | 18 | 19 | 20 | 21 |
| Treating Liquid* | Metal-containing Treating agent | Agent O | Agent P | Agent Q | Agent R | Agent S | Agent T | Agent U |
| | First agent | 2.5 | 2.5 | 2.5 | 2.5 | 2.5 | 2.5 | 2.5 |
| | Second agent | 2.5 | 2.5 | 2.5 | 2.5 | — | 2.5 | — |
| | Water | 95 | 95 | 95 | 95 | 97.5 | 95 | 97.5 |
| Metal ion fixing ratio (%) | | 91 | 96 | 86 | 85 | 30 | 80 | 21 |

*The constitution of treating liquid is shown in mixed amount (ml) per 100 ml.

EXAMPLE 14

Preparation of a Metal-containing Treating Agent and Anti-organism Treatment Metal-containing treating agents V, W, and X were prepared by further adding boric acid (3 g), 100 mg of propetamphos+1 g of POE (10) nonylphenylether, or didecyldimethylammonium chloride (1 g) per 100 ml of the first agent to the metal-containing treating agent H shown in Example 13.

On each of the agents to whom additional components were added, storage stability was examined by leaving it standing for 2 weeks after the preparation. In neither case, separation of components, generation of precipitate, and decrease in concentration of dissolved metal ion were observed.

Using the metal-containing treating agents V, W, and X, respectively, treating liquid in a proportion of 5 ml of the first agent, 1 ml of the second agent, 94 ml of water, were prepared and impregnation treatment and leaching treatment on wood block samples were carried out in the same manner as in Example 13. Analysis of leached metal ions was conducted by the ICP method and metal ion fixing ratio was calculated. As a result, the ratios of residual metal in the blocks were 90%, 87%, and 90%, respectively. It revealed that even in the case where a chemical agent, such as boric acid, was added, the metal-containing treating agent used in the present invention maintained a high metal ion fixing effect.

EXAMPLE 15

Anti-organism Property Test

Antimicrobial tests were practiced on the sample blocks a to g and o to u on which the impregnation treatment and leaching operation were carried out in Example 13, the tests being in accordance with JISA9201 (Performance standard for wood antiseptics and test method, 1991) using *Tyromyces palustris* FFPRI 0507 (obtained from Forestry and Forest Products Research Institute, Ministry of Agroforestry and Fishery).

After the antimicrobial tests, each block was taken out of the incubation bottle. The hyphae on the surface of the block were removed sufficiently. The block was air-dried for about 24 hours and then dried sufficiently using a drier and dessicator as described above before measuring the weight. Weight decrease ratio of the block was calculated. The results are as shown in Tables 9 to 10. As a result, it revealed that the method for treating wood according to the present invention could effectively impart wood with antimicrobial property.

TABLE 9

Anti-organism property of treated wood block

| Sample block | a | b | C | d | e | f | g |
|---|---|---|---|---|---|---|---|
| Ratio of weight decrease (%)* | 1.8 | 15.4 | 0.8 | 8.6 | 0.8 | 7.4 | 2.0 |

*Weight decrease in block without treatment was 36.7%.

TABLE 10

Anti-organism property of treated wood block

| Sample block | o | p | q | r | s | t | u |
|---|---|---|---|---|---|---|---|
| Ratio of weight decrease (%)* | 1.1 | 0.3 | 2.2 | 5.7 | 16.2 | 2.0 | 17.1 |

*Weight decrease in block without treatment 36.7%.

EXAMPLE 16

Treatment of Articles with a Metal-containing Treating Agent

Using, as an article to be treated, generally shaped test pieces (about 9 cm×about 5 cm×about 3cm) obtained by crushing a commercially available porous brick, using the treating liquids prepared in Example 13, 10 ml of the treating liquid 5 (containing the metal-containing treating agent E), treating liquid 6 (containing the metal-containing treating agent F), or treating liquid 16 (containing the metal-containing treating agent P) was coated on one surface (about 9 cm×about 5 cm) of the above test piece. Then, each test piece was placed in an incubator at 28° C. for 5 days to carry out drying and fixing reaction. Thereafter, 500 ml of water was added to each test piece and each test piece was thus dipped in static water for 5 hours to carry out leaching operation. Each leached solution was analyzed by the ICP method in the same manner as in Example 13 and metal fixing ratio was calculated.

The test pieces treated with the treating liquids 5 and 16 containing the metal-containing treating agents E and P of the present invention respectively, showed high metal fixing ratios of 65% and 77%, respectively. On the contrary, treatment with the treating liquid 6 containing the metal-containing treating agent F, comparative example, indicated a ratio of residual metal of 10%. Thus, it revealed that the metal-containing treating agent of the present invention also exhibited high metal ion fixing ratios with respect to porous articles other than wood.

EXAMPLE 17

Time Dependent Stability of Treating Liquid

The treating liquids 1, 3, 5, 7, 16 and 17 prepared in Example 13 were stored in glass vials of 120 ml in total inner volume, respectively, each in an amount of 100 ml and stored at 25° C. After storing 7 days or 30 days, the concentration of dissolved metal ion in the treating liquids was measured. The results are shown in Table 11.

TABLE 11

Stability of treating liquid

| Treating Liquid Number | | 1 | 3 | 5 | 7 | 16 | 17 |
|---|---|---|---|---|---|---|---|
| Constitution Of Treating Liquid | Metal-containing Treating agent | Agent A | Agent C | Agent E | Agent G | Agent P | Agent Q |
| | First agent | 10 | 5 | 2.5 | 2.5 | 2.5 | 2.5 |
| | Second agent | 10 | 5 | 2.5 | 2.5 | 2.5 | 2.5 |
| | Water | 80 | 90 | 95 | 95 | 95 | 95 |
| Concentration of dissolved metal ion (upon preparation 100) | After 7 days | 100 | 100 | 100 | 100 | 100 | 100 |
| | After 30 days | 100 | 100 | 100 | 100 | 97 | 100 |

Further, using the treating agents stored for respective periods of time, impregnation treatment on a Japan cedar wood material was conducted in the same manner as in Example 13 and the fixing ratio of metal ion to the block was calculated by the ICP method in the same manner as in Example 13. The results are shown in Table 12.

TABLE 12

Time-dependent change of metal fixing property of treating liquid

| Treating Liquid Number | 1 | 3 | 5 | 7 | 16 | 17 |
|---|---|---|---|---|---|---|
| Metal ion fixing ratio (%) | | | | | | |
| After 7 days | 93 | 94 | 95 | 91 | 96 | 86 |
| After 30 days | 92 | 94 | 95 | 90 | 94 | 84 |

Note: treatment subject was Japan cedar wood sample

As shown in the above results, it was observed that the metal-containing treating agent of the present invention showed substantially neither a decrease in concentration of dissolved metal ion nor a decrease in fixing property even after about 1 month storage after the preparation of treating liquid.

INDUSTRIAL APPLICABILITY

By use of the method for treating wood according to the present invention, leaching of a metal, a metal compound, and/or a metal ion as active ingredient can be improved and treated wood products having useful effects such as long-sustained anti-organism properties and causing no environmental pollution can be obtained. Also, useful industrial application methods for lignin, lignosulfonic acid, or lignosulfonic acid salts are provided.

What is claimed is:

1. A method for treating wood, characterized by impregnating wood with a metal-containing treating agent containing (a) lignin and/or a lignin derivative, (b) a metal, a metal compound, and/or a metal ion and (c) an organic alkalizing agent selected from the group consisting of monoethanolamine, diethanolamine, triethanolamine and ethylenediamine and then oxidizing and/or macromolecularizing the lignin and/or lignin derivative in the wood to fix the metal component in the wood.

2. The method for treating wood according to claim 1, wherein the metal-containing treating agent contains the metal, metal compound, and/or metal ion in a concentration of 0.5 g/liter or more as metal.

3. The method for treating wood according to claim 1, wherein the metal-containing treating agent contains at least one metal selected from zirconium, titanium, vanadium, chromium, molybdenum, manganese, iron, cobalt, nickel, palladium, copper, silver, zinc, cadmium, aluminum, tin, lead, antimony, calcium, magnesium, strontium, and barium or ions thereof.

4. The method for treating wood according to claim 1, wherein the metal-containing treating agent is prepared by mixing a first agent containing a metal, a metal compound and/or a metal ion and said organic alkalizing agent, and a second agent containing lignin and/or lignin derivatives.

5. The method for treating wood according to claim 1, wherein the oxidizing and/or macromolecularization reaction is accelerated by heating.

6. The method for treating wood according to claim 5, wherein the heating is performed at a temperature within the range of 20 to 300° C.

7. The method for treating wood according to claim 6, wherein the heating is performed at a temperature within the range of 40 to 150° C.

8. The method for treating wood according to claim 1, wherein the oxidizing and/or macromolecularization reaction is performed in the presence of a polyphenol oxidizing catalyst.

9. The method for treating wood according to claim 8, wherein the polyphenol oxidizing catalyst is catechol oxidase, laccase, polyphenol oxidase, ascorbic acid oxidase, bilirubin oxidase or peroxidase.

10. The method for treating wood according to claim 1, wherein the lignin derivative is obtained by crosslinking reaction and/or macromolecularization reaction of lignin or ligninsufonic acid with a phenolic compound and/or an aromatic amine compound.

11. The method for treating wood according to claim 10, wherein, the phenolic compound is at least one compound selected from the group consisting of pyrocatechol, hydroquinone, pyrogallol, gallic acid, tannic acid, and ferulic acid.

12. Wood treated by the method according to any one of claims 1 to 11.

13. A method for producing a woody material containing a metal, a metal compound, and/or a metal ion, characterized by comprising a step in which a raw material wood is treated by the method according to any one of claims 1 to 11.

14. The method for producing a woody material according to claim 13, wherein the raw material wood is laminated lumber, single plate laminate, plywood, particle board, fiber board, or raw materials thereof.

15. A woody material containing a metal, a metal compound and/or a metal ion obtained by the production method according to claim 13.

16. The method for treating wood according to claim 1, wherein the metal-containing treating agent is prepared by mixing a metal, a metal compound, and/or a metal ion and said organic alkalizing agent, and a lignin and/or lignin derivatives.

* * * * *